UNITED STATES PATENT OFFICE.

FRANCIS A. FRISCIA, OF BROOKLYN, NEW YORK.

IMPROVEMENT IN FOOD OR SAUCE.

Specification forming part of Letters Patent No. 145,562, dated December 16, 1873; application filed December 1, 1873.

*To all whom it may concern:*

Be it known that I, FRANCIS A. FRISCIA, of Brooklyn, in the county of Kings and State of New York, have invented or produced a new and Improved Gravy or Sauce; and the following is declared to be a specification of the mode of preparing the same.

This gravy is intended for use with maccaroni especially, and for that reason I call the same maccaroni-gravy, but it is adapted for general table use for flavoring roasts, stews, and soups, and is adapted for broth for invalids in consequence of its flavor and its strengthening and nutritious qualities.

I use the following materials in about the proportions named: Beef, twenty pounds; pork, five pounds; concentrated extract of tomatoes, three pounds; onions, twelve quarts; lard, three pounds; sherry wine, one pint; tomato-juice, four gallons; Spanish pimenton, one-half pound; flour, (wheat,) one-quarter pound; powdered chocolate, three ounces; mixed spices, one-half ounce; pepper and salt to suit the taste.

I prepare the gravy in the following manner: The meat is cut into thick slices of four or five pounds each, and placed in a baking-pan with lard, pepper, and salt. It is then put in an oven and allowed to brown on the outside, but should not be cooked through. It is then removed and put in a boiler large enough to hold all the ingredients. The onions are sliced fine and baked in a pan with lard until soft, and they are then mashed and placed over the meat. The extract of tomatoes are dissolved in the sherry wine, and when of the consistency of cream are put in the boiler with the meat and onions. The materials in the boiler are then boiled slowly, and the tomato-juice poured in with them in small quantities from time to time, and the pimento, pepper, salt, and spices are added, and the whole is boiled for about six hours, or until the meat is soft. The liquid is then strained into a clean boiler and the meat pressed to extract all the juice, and the same is also strained into the boiler with the liquid. The flour and chocolate are put in, and the whole is well stirred and allowed to boil slowly for two hours, when it is ready for use.

When this sauce is not to be used immediately it is preferable to place it in bottles or hermetically-sealed cans.

I claim as my invention—

The sauce or gravy, composed of the ingredients and prepared in the manner substantially as set forth.

Signed by me this 26th day of November, 1873.

FRANCIS A. FRISCIA.

Witnesses:
GEO. T. PINCKNEY,
CHAS. H. SMITH.